(12) United States Patent
Fukaya

(10) Patent No.: US 11,156,805 B2
(45) Date of Patent: Oct. 26, 2021

(54) IMAGING LENS

(71) Applicant: KANTATSU CO., LTD., Yaita (JP)

(72) Inventor: Hisao Fukaya, Sukagawa (JP)

(*) Notice: Subject to any disclaimer, the term of this patent is extended or adjusted under 35 U.S.C. 154(b) by 130 days.

(21) Appl. No.: 16/534,441

(22) Filed: Aug. 7, 2019

(65) Prior Publication Data

US 2020/0233181 A1    Jul. 23, 2020

(30) Foreign Application Priority Data

Aug. 8, 2018 (JP) .............. JP2018-149691

(51) Int. Cl.
| | | |
|---|---|---|
| G02B 13/00 | (2006.01) | |
| G02B 9/62 | (2006.01) | |
| G02B 27/00 | (2006.01) | |
| H04N 5/225 | (2006.01) | |
| G02B 5/00 | (2006.01) | |
| G02B 3/04 | (2006.01) | |

(52) U.S. Cl.
CPC ......... *G02B 13/0045* (2013.01); *G02B 9/62* (2013.01); *G02B 27/0025* (2013.01); *H04N 5/2254* (2013.01); *G02B 3/04* (2013.01); *G02B 5/005* (2013.01); *G02B 13/001* (2013.01); *G02B 13/002* (2013.01)

(58) Field of Classification Search
CPC .. G02B 13/0045; G02B 9/62; G02B 27/0025; G02B 5/005; G02B 13/002; G02B 3/04; G02B 13/001; H04N 5/2254
USPC ................. 359/713, 740, 756, 757
See application file for complete search history.

(56) References Cited

U.S. PATENT DOCUMENTS

| | | | | |
|---|---|---|---|---|
| 8,385,006 B2* | 2/2013 | Tsai | .............. | G02B 13/18 |
| | | | | 359/713 |
| 8,503,096 B2* | 8/2013 | Imaoka | ................. | G02B 9/14 |
| | | | | 359/684 |
| 8,743,482 B1* | 6/2014 | Tsai | .............. | G02B 9/62 |
| | | | | 359/757 |
| 8,749,896 B2* | 6/2014 | Shinohara | ......... | G02B 13/0045 |
| | | | | 359/713 |
| 9,715,086 B2* | 7/2017 | Tanaka | .............. | G02B 13/0045 |
| 2014/0192433 A1* | 7/2014 | Thompson | ............. | G11B 15/68 |
| | | | | 360/31 |
| 2014/0218582 A1* | 8/2014 | Chen | .............. | G02B 9/62 |
| | | | | 359/713 |

(Continued)

FOREIGN PATENT DOCUMENTS

| | | |
|---|---|---|
| CN | 108089316 A | 5/2018 |
| TW | 617834 B | 3/2018 |

*Primary Examiner* — Evelyn A Lester
(74) *Attorney, Agent, or Firm* — Hamre, Schumann, Mueller & Larson, P.C.

(57) ABSTRACT

There is provided an imaging lens with small telephoto ratio and excellent optical characteristics which satisfies demand of the downsizing, the low-profileness and the low F-number. An imaging lens comprises, in order from an object side to an image side, a first lens with positive refractive power, a second lens, a third lens, a fourth lens being a double-sided aspheric lens, a fifth lens being a double-sided aspheric lens, and a sixth lens having a convex surface facing the image side, and a below conditional expression is satisfied:

0.60<TTL/f<1.00 where
TTL: a total track length, and
f: a focal length of the overall optical system of the imaging lens.

15 Claims, 8 Drawing Sheets

(56) References Cited

U.S. PATENT DOCUMENTS

| | | | |
|---|---|---|---|
| 2015/0070784 A1* | 3/2015 | Chen | G02B 9/62 |
| | | | 359/713 |
| 2015/0146309 A1* | 5/2015 | Ota | G02B 13/0045 |
| | | | 359/757 |
| 2016/0004042 A1* | 1/2016 | Kubota | G02B 13/0045 |
| | | | 359/713 |
| 2016/0109688 A1* | 4/2016 | Jo | H04N 5/2253 |
| | | | 359/713 |
| 2016/0139368 A1* | 5/2016 | You | G02B 13/0045 |
| | | | 359/713 |
| 2016/0187620 A1* | 6/2016 | Huang | G02B 13/0045 |
| | | | 359/713 |
| 2017/0329109 A1* | 11/2017 | Kubota | G02B 13/0045 |
| 2018/0024323 A1* | 1/2018 | Teraoka | G02B 9/62 |
| | | | 359/713 |
| 2018/0024325 A1* | 1/2018 | Teraoka | G02B 13/0045 |
| | | | 359/713 |
| 2018/0024326 A1* | 1/2018 | Teraoka | G02B 13/0045 |
| | | | 359/713 |
| 2018/0059363 A1* | 3/2018 | Kubota | G02B 9/64 |
| 2018/0059378 A1* | 3/2018 | Kubota | G02B 13/0045 |
| 2018/0180856 A1* | 6/2018 | Jung | G02B 13/0045 |
| 2019/0025553 A1* | 1/2019 | Ko | G02B 13/00 |
| 2019/0086642 A1 | 3/2019 | Chen et al. | |
| 2019/0121061 A1* | 4/2019 | Jung | G02B 9/62 |
| 2019/0129148 A1* | 5/2019 | Son | G02B 13/02 |
| 2019/0146183 A1* | 5/2019 | Lee | G02B 13/0045 |
| | | | 359/713 |
| 2019/0204543 A1 | 7/2019 | Teraoka et al. | |

* cited by examiner

IMAGING LENS

The present application is based on and claims priority of a Japanese patent application No. 2018-149691 filed on Aug. 8, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as an information terminal equipment, a home appliance, an automobile, and so on. Development of products with the camera function will be made accordingly.

The imaging lens mounted in such equipment is required to be compact and have high-resolution performance.

As a conventional imaging lens aiming high performance, for example, the imaging lens disclosed in Patent Documents 1 and 2 below have been known.

Patent Document 1 (CN108089316A) discloses an imaging lens comprising, in order from an object side, a first lens made of a plastic material, a second lens having negative refractive power and made of the plastic material, a third lens having positive refractive power and made of the plastic material, a fourth lens made of a glass material, a fifth lens made of the plastic material, and a sixth lens made of the glass material.

Patent Document 2 (TWI617834) discloses an imaging lens comprising, in order from an object side, a first lens, a second lens, a third lens, a fourth lens, a fifth lens and a sixth lens, wherein said first lens has positive refractive power, said fourth lens has negative refractive power, an object-side surface of said fifth lens is a concave surface near an optical axis. Regarding the sixth lens, an image-side surface is a convex surface near the optical axis, an object-side surface and the image-side surface are aspheric surfaces, and at least one surface of the object-side surface and the image-side surface has at least one inflection point.

SUMMARY OF THE INVENTION

An imaging lens disclosed in Patent Document 1 is large in a telephoto ratio (a ratio of a total track length to a focal length), and there is a problem with low-profileness.

An imaging lens disclosed in Patent Document 2 is large in a ratio of a total track length to a diagonal length of an image sensor, and there is a problem with low-profileness.

The present invention has been made in view of the above-described problems, and an object of the present invention is to provide an imaging lens with high resolution which satisfies demand of downsizing, the low-profileness and a low F-number in well balance, is small in a telephoto ratio and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power, a second lens, a third lens, a fourth lens being a double-sided aspheric lens, a fifth lens being a double-sided aspheric lens, and a sixth lens having a convex surface facing the image side.

According to the imaging lens having the above-described configuration, the first lens achieves downsizing and low-profileness by strengthening the positive refractive power.

The second lens and the third lens correct aberrations such as spherical aberration, coma aberration, astigmatism and field curvature while maintaining the downsizing and the low-profileness.

The fourth lens and the fifth lens properly correct aberrations at a peripheral area by the aspheric surfaces on both sides.

The sixth lens properly corrects distortion. When an image-side surface of the sixth lens is convex, an emission angle of an off-axial light ray emitted from this surface is controlled to be small and off-axial aberration can be properly corrected.

According to the imaging lens having the above-described configuration, it is preferable that a below conditional expression (1) is satisfied:

$$0.60 < TTL/f < 1.00 \tag{1}$$

where
TTL: a total track length, and
f: a focal length of the overall optical system of the imaging lens.

The conditional expression (1) defines a telephoto ratio. When a value is below the upper limit of the conditional expression (1), the total track length can be shortened and downsizing the imaging lens can be facilitated. On the other hand, when the value is above the lower limit of the conditional expression (1), correction of the distortion and axial chromatic aberration can be facilitated and excellent optical performance can be maintained.

According to the imaging lens having the above-described configuration, it is preferable that an image-side surface of the first lens is a concave surface facing the image side near the optical axis, and more preferable that a below conditional expression (2) is satisfied:

$$1.00 < r2/f < 1.90 \tag{2}$$

where
r2: a paraxial curvature radius of the image-side surface of the first lens, and
f: a focal length of the overall optical system of the imaging lens.

When the image-side surface of the first lens is concave, the spherical aberration and the coma aberration can be properly corrected.

The conditional expression (2) defines a shape of the image-side surface the first lens near the optical axis. By satisfying the conditional expression (2), the low-profileness can be achieved and the spherical aberration and the coma aberration can be properly corrected.

According to the imaging lens having the above-described configuration, it is preferable that a below conditional expression (3) is satisfied:

$$0.72 < D2/D3 < 1.07 \quad (3)$$

where
D2: a thickness of the second lens along the optical axis, and
D3: a thickness of the third lens along the optical axis.

The conditional expression (3) defines an appropriate range of the thickness of the second lens along the optical axis and the thickness of the third lens along the optical axis. By satisfying the conditional expression (3), the spherical aberration can be properly corrected.

According to the imaging lens having the above-described configuration, it is preferable that the fifth lens has the negative refractive power near the optical axis.

When the refractive power of the fifth lens is negative, a back focus can be secured and the chromatic aberration can be properly corrected.

According to the imaging lens having the above-described configuration, it is preferable that an image-side surface of the fifth lens is a concave surface facing the image side near the optical axis and has at least one pole point in a position off the optical axis, and more preferable that a below conditional expression (4) is satisfied:

$$0.50 < r10/f < 1.00 \quad (4)$$

where
r10: a paraxial curvature radius of an image-side surface of the fifth lens, and
f: a focal length of the overall optical system of the imaging lens.

When an image-side surface of the fifth lens is concave near the optical axis and has at least one pole point in a position off the optical axis, the field curvature and the distortion can be properly corrected.

The conditional expression (4) defines a shape of the concave image-side surface of the fifth lens near the optical axis. When the image-side surface of the fifth lens is concave satisfying the conditional expression (4), the back focus can be appropriately secured. Furthermore, the distortion and the coma aberration can be properly corrected.

According to the imaging lens having the above-described configuration, it is preferable that a below conditional expression (5) is satisfied:

$$-13.00 < r12/f < -1.90 \quad (5)$$

where
r12: a paraxial curvature radius of an image-side surface of the sixth lens, and
f: a focal length of the overall optical system of the imaging lens.

The conditional expression (5) defines a shape of an image-side surface of the sixth lens near the optical axis. By satisfying the conditional expression (5), the distortion and chromatic aberration of magnification can be properly corrected.

According to the imaging lens having the above-described configuration, it is preferable that an object-side surface of the sixth lens is a plane surface or a concave surface facing the object side near the optical axis, and more preferable that a below conditional expression (6) is satisfied:

$$-0.20 < (Nd6-1)/r11 \leq 0.0 \quad (6)$$

where
Nd6: a refractive index at d-ray of the sixth lens, and
r11: a paraxial curvature radius of an object-side surface of the sixth lens.

An upper value of 0.0 of the conditional expression (6) means that the object-side surface of the sixth lens may be a plane surface.

The conditional expression (6) defines an appropriate range of the refractive power of the object-side surface of the sixth lens. By satisfying the conditional expression (6), the chromatic aberration of magnification and the distortion can be properly corrected.

According to the imaging lens having the above-described configuration, it is preferable that the second lens is formed in a meniscus shape having a concave image-side surface near the optical axis.

When the second lens is formed in a meniscus shape having a concave image-side surface near the optical axis, the axial chromatic aberration, high-order spherical aberration, the coma aberration and the field curvature can be properly corrected.

According to the imaging lens having the above-described configuration, it is preferable that the second lens has negative refractive power near the optical axis, and more preferable that a below conditional expression (7) is satisfied:

$$-1.30 < f2/f < -0.70 \quad (7)$$

where
f2: a focal length of the second lens, and
f: a focal length of the overall optical system of the imaging lens.

When the second lens has the negative refractive power, the spherical aberration and the chromatic aberration can be properly corrected.

The conditional expression (7) defines an appropriate range of refractive power of the second lens. By satisfying the conditional expression (7), the low-profileness can be achieved and the field curvature can be properly corrected.

According to the imaging lens having the above-described configuration, it is preferable that a below conditional expression (8) is satisfied:

$$-1.80 < f5/f < -0.80 \quad (8)$$

where
f5: a focal length of the fifth lens, and
f: a focal length of the overall optical system of the imaging lens.

The conditional expression (8) defines an appropriate range of refractive power of the fifth lens. By satisfying the conditional expression (8), the low-profileness can be achieved and the coma aberration and the distortion can be properly corrected.

According to the imaging lens having the above-described configuration, it is preferable that a below conditional expression (9) is satisfied:

$$0.30 < T3/T4 < 0.90 \quad (9)$$

where
T3: a distance along the optical axis from an image-side surface of the third lens to an object-side surface of the fourth lens, and
T4: a distance along the optical axis from an image-side surface of the fourth lens to an object-side surface of the fifth lens.

The conditional expression (9) defines an appropriate range of a distance between the third lens and the fourth lens and a distance between the fourth lens and the fifth lens. By satisfying the conditional expression (9), the coma aberration and the spherical aberration can be properly corrected.

According to the imaging lens having the above-described configuration, it is preferable that a below conditional expression (10) is satisfied:

$$0.05<D6/f<0.25 \quad (10)$$

where
D6: a thickness of the sixth lens along the optical axis, and
f: a focal length of the overall optical system of the imaging lens.

The conditional expression (10) defines an appropriate range of a thickness of the sixth lens along the optical axis. When a value is below the upper limit of the conditional expression (10), the thickness of the sixth lens along the optical axis is suppressed from being too large, and the low-profileness can be more facilitated. On the other hand, when the value is above the lower limit of the conditional expression (10), the thickness of the sixth lens along the optical axis is suppressed from being too small, and the formability of the lens becomes excellent. Furthermore, by satisfying the conditional expression (10), the back focus can be appropriately secured and the distortion can be properly corrected.

According to the imaging lens having the above-described configuration, it is preferable that a below conditional expression (11) is satisfied:

$$1.80<|r9|/f<19.00 \quad (11)$$

where
r9: a paraxial curvature radius of an object-side surface of the fifth lens, and
f: a focal length of the overall optical system of the imaging lens.

The conditional expression (11) defines a shape of the object-side surface of the fifth lens near the optical axis. By satisfying the conditional expression (11), the back focus can be appropriately secured, and the distortion and the coma aberration can be properly corrected.

According to the imaging lens having the above-described configuration, it is preferable that a below conditional expression (12) is satisfied:

$$3.5<|f3|/f \quad (12)$$

where
f3: a focal length of the third lens, and
f: a focal length of the overall optical system of the imaging lens.

The conditional expression (12) defines an appropriate range of refractive power of the third lens. By satisfying the conditional expression (12), the spherical aberration and the chromatic aberration can be properly corrected.

According to the imaging lens having the above-described configuration, it is preferable that a below conditional expression (13) is satisfied:

$$-7.0<(D5/f5)\times100<-2.0 \quad (13)$$

where
D5: a thickness of the fifth lens along the optical axis, and
f5: a focal length of the fifth lens.

The conditional expression (13) defines an appropriate range of a thickness of the fifth lens along the optical axis. When a value is below the upper limit of the conditional expression (13), the thickness of the fifth lens along the optical axis is suppressed from being too large, and air gaps on the object side and the image side of the fifth lens can be easily secured. As a result, the low-profileness can be achieved. In addition, by satisfying the conditional expression (13), the distortion and the coma aberration can be properly corrected.

According to the imaging lens having the above-described configuration, it is preferable that a below conditional expression (14) is satisfied:

$$9.0<(T4/f)\times100<24.00 \quad (14)$$

where
T4: a distance along the optical axis from an image-side surface of the fourth lens to an object-side surface of the fifth lens, and
f: a focal length of the overall optical system of the imaging lens.

The conditional expression (14) defines an appropriate range of the distance along the optical axis between the fourth lens and the fifth lens. By satisfying the conditional expression (14), the distortion, the coma aberration, the spherical aberration and the chromatic aberration of magnification can be properly corrected.

According to the imaging lens having the above-described configuration, it is preferable that a below conditional expression (15) is satisfied:

$$0.60<TTL/(2\times ih)<1.00 \quad (15)$$

where
TTL: a total track length, and
ih: a maximum image height.

The conditional expression (15) defines a ratio of total track length to a diagonal length, namely a degree of the low-profileness. By satisfying the conditional expression (15), the imaging lens which sufficiently achieves the low-profileness can be obtained.

According to the imaging lens having the above-described configuration, it is preferable that a below conditional expression (16) is satisfied:

$$0.40<f1/f<0.80 \quad (16)$$

where
f1: a focal length of the first lens, and
f: a focal length of the overall optical system of the imaging lens.

The conditional expression (16) defines an appropriate range of the refractive power of the first lens. By satisfying the conditional expression (16), positive refractive power of the first lens becomes appropriate, and the low-profileness can be achieved. Furthermore, by satisfying the conditional expression (16), the spherical aberration and the coma aberration can be properly corrected.

According to the imaging lens having the above-described configuration, it is preferable that a below conditional expression (17) is satisfied:

$$2.0<|f6|/f<25.0 \quad (17)$$

where
f6: a focal length of the sixth lens, and
f: a focal length of the overall optical system of the imaging lens.

The conditional expression (17) defines an appropriate range of the refractive power of the sixth lens. By satisfying the conditional expression (17), the back focus can be appropriately secured and the distortion and the chromatic aberration of magnification can be properly corrected.

According to the imaging lens having the above-described configuration, it is preferable that a below conditional expression (18) is satisfied:

$$1.20<(T1/f)\times 100<2.50 \quad (18)$$

where

T1: a distance along the optical axis from the image-side surface of the first lens to the object-side surface of the second lens, and f: a focal length of the overall optical system of the imaging lens.

The conditional expression (18) defines an appropriate range of a distance along the optical axis between the first lens and the second lens. By satisfying the conditional expression (18), the total track length can be shortened and the spherical aberration can be properly corrected.

According to the imaging lens having the above-described configuration, it is preferable that a below conditional expression (19) is satisfied:

$$5.0<(T3/f)\times 100<13.0 \quad (19)$$

where

T3: a distance along the optical axis from the image-side surface of the third lens to the object-side surface of the fourth lens, and f: a focal length of the overall optical system of the imaging lens.

The conditional expression (19) defines an appropriate range of a distance along the optical axis between the third lens and the fourth lens. By satisfying the conditional expression (19), the coma aberration and the spherical aberration can be properly corrected.

According to the imaging lens having the above-described configuration, it is preferable that a below conditional expression (20) is satisfied:

$$TTL/EPd \leq 2.5 \quad (20)$$

where

TTL: a total track length, and

EPd: an entrance pupil diameter.

The conditional expression (20) defines relationship between the total track length and the entrance pupil diameter. By satisfying the conditional expression (20), the total track length can be shortened, decrease in light quantity at the peripheral area can be prevented and an image having sufficient brightness from a center to a peripheral area can be obtained.

According to the imaging lens having the above-described configuration, it is preferable that a below conditional expression (21) is satisfied:

$$1.50<vd1/vd2<3.50 \quad (21)$$

where vd1: an abbe number at d-ray of the first lens, and vd2: an abbe number at d-ray of the second lens.

The conditional expression (21) defines relationship between the abbe number at d-ray of the first lens and the abbe number at d-ray of the second lens. By using a material satisfying the conditional expression (21), the chromatic aberration can be properly corrected.

According to the imaging lens having the above-described configuration, it is preferable that a below conditional expression (22) is satisfied:

$$1.50<vd3/vd4<3.50 \quad (22)$$

where vd3: an abbe number at d-ray of the third lens, and vd4: an abbe number at d-ray of the fourth lens.

The conditional expression (22) defines relationship between the abbe number at d-ray of the third lens and the abbe number at d-ray of the fourth lens. By using a material satisfying the conditional expression (22), the chromatic aberration can be properly corrected.

According to the imaging lens having the above-described configuration, it is preferable that a below conditional expression (23) is satisfied:

$$1.50<vd5/vd6<3.50 \quad (23)$$

where vd5: an abbe number at d-ray of the fifth lens, and vd6: an abbe number at d-ray of the sixth lens.

The conditional expression (23) defines relationship between the abbe number at d-ray of the fifth lens and the abbe number at d-ray of the sixth lens. By using a material satisfying the conditional expression (23), the chromatic aberration can be properly corrected.

According to the imaging lens having the above-described configuration, it is preferable that a below conditional expression (24) is satisfied:

$$1.00<D3/D4<1.30 \quad (24)$$

where

D3: a thickness of the third lens along the optical axis, and

D4: a thickness of the fourth lens along the optical axis.

The conditional expression (24) defines an appropriate range of relationship between the thickness of the third lens along the optical axis and the thickness of the fourth lens along the optical axis. By satisfying the conditional expression (24), the spherical aberration can be properly corrected.

According to the imaging lens having the above-described configuration, it is preferable that a below conditional expression (25) is satisfied:

$$5.0<f4/f \quad (25)$$

where f4: a focal length of the fourth lens, and f: a focal length of the overall optical system of the imaging lens.

The conditional expression (25) defines an appropriate range of the refractive power of the fourth lens. By satisfying the conditional expression (25), the spherical aberration, the chromatic aberration and the distortion can be properly corrected.

The conditional expression (25) is satisfied when the fourth lens has an object-side surface and an image-side surface which are plane near the optical axis and substantially has no refractive power near the optical axis.

According to the imaging lens having the above-described configuration, it is preferable that a below conditional expression (26) is satisfied:

$$T1<T2<T3<T4 \quad (26)$$

where

T1: a distance along the optical axis from an image-side surface of the first lens to an object-side surface of the second lens, T2: a distance along the optical axis from an image-side surface of the second lens to an object-side surface of the third lens, T3: a distance along the optical axis from an image-side surface of the third lens to an object-side surface of the fourth lens, and T4: a distance along the optical axis from an image-side surface of the fourth lens to an object-side surface of the fifth.

The conditional expression (26) defines an relationship of a distance along the optical axis from the first lens to the fifth lens. By satisfying the conditional expression (26), the coma aberration, the spherical aberration and the chromatic aberration can be properly corrected.

Effect of Invention

According to the present invention, there can be provided an imaging lens with high resolution which satisfies demand of the downsizing, the low-profileness and the low F-number in well balance, is small in telephoto ratio and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5 and 7 are schematic views of the imaging lenses in Examples 1 to 4 according to the embodiments of the present invention, respectively.

Figure 1:
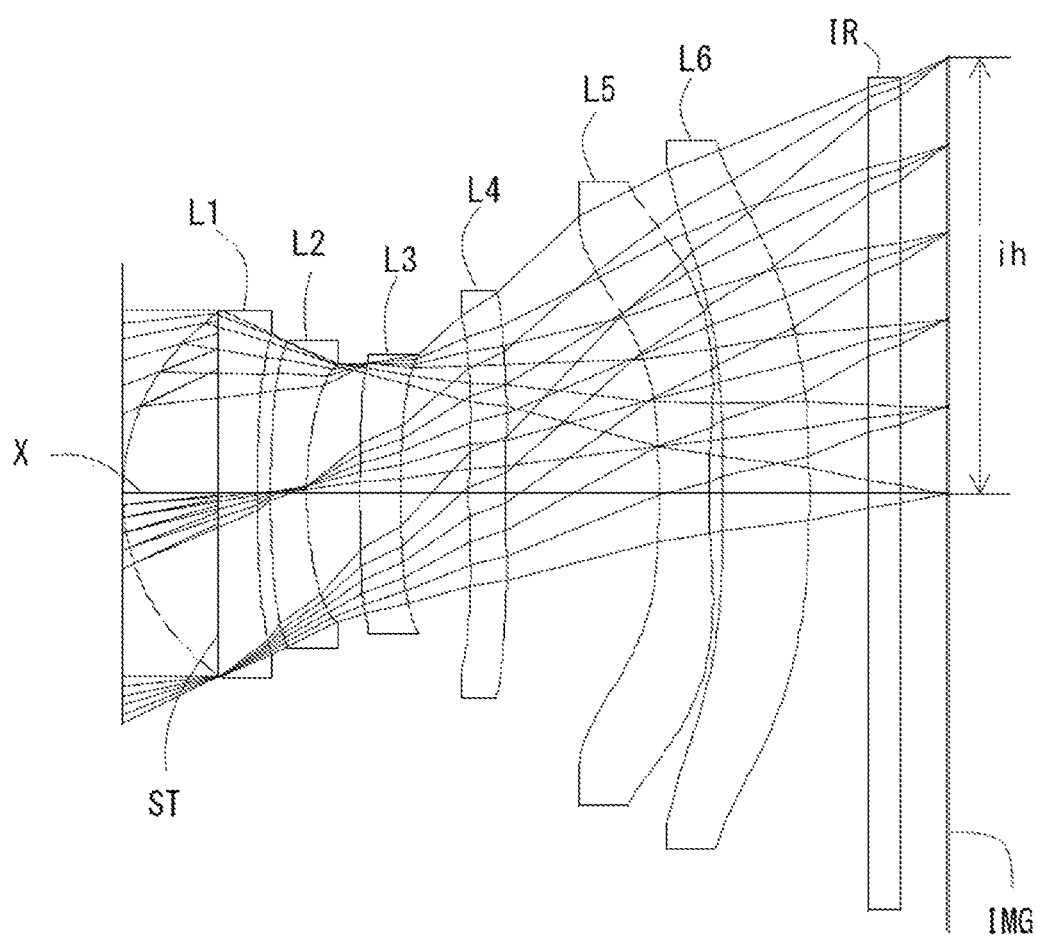
FIG. 1 is a schematic view showing an imaging lens in Example 1 according to the present invention.

As shown in FIG. 1, the imaging lens according to the present embodiment comprises, in order from an object side to an image side, a first lens L1 with positive refractive power, a second lens L2, a third lens L3, a fourth lens L4 being a double-sided aspheric lens, a fifth lens L5 being a double-sided aspheric lens and a sixth lens L6 having a convex surface facing the image side.

A filter IR such as an IR cut filter and a cover glass are arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has the positive refractive power and is formed in a meniscus shape having a convex surface facing the object side and a concave surface facing the image side near the optical axis X. Therefore, the spherical aberration and the coma aberration can be properly corrected while achieving downsizing and reduction in profile.

The second lens L2 has the negative refractive power and is formed in a meniscus shape having a convex surface facing the object side and a concave surface facing the image side near the optical axis X. Therefore, the axial chromatic aberration, high-order spherical aberration, the coma aberration and the field curvature can be properly corrected.

The third lens L3 has the negative refractive power and is formed in a meniscus shape having a convex surface facing the object side and a concave surface facing the image side near the optical axis X. Therefore, the high-order spherical aberration, the coma aberration and the field curvature can be properly corrected. In addition, the refractive power of the third lens L3 may be positive as in the Examples 3. In this case, the positive refractive power is distributed to the first lens L1 and the third lens L3, and the positive refractive power of the first lens L1 can be reduced. As a result, a thickness deviation ratio of the first lens L1 can be restricted to be small, and formability of the first lens L1 becomes excellent.

The fourth lens L4 has the positive refractive power and is formed in a meniscus shape having a convex surface facing the object side and a concave surface facing the image side near the optical axis X. Therefore, the chromatic aberration, the spherical aberration, coma aberration and the field curvature can be properly corrected.

In addition, the fourth lens L4 may have an object-side surface and an image-side surface which are plane near the optical axis X and substantially have no refractive power near the optical axis X as in the Examples 3 and 4. In this case, the astigmatism, the field curvature, the distortion and the chromatic aberration at the peripheral area can be properly corrected by aspheric surfaces on both sides without affecting a focal length of an overall optical system of the imaging lens.

The fifth lens L5 has the negative refractive power and is formed in a biconcave shape having concave surfaces facing the object side and the image side near the optical axis X. Therefore, the back focus is appropriately secured and the chromatic aberration, the distortion and the coma aberration can be properly corrected. Furthermore, when the both sides are concave near the optical axis X, a curvature is suppressed from being large, and sensitivity to a manufacturing error is reduced. The shape of the fifth lens L5 may be a meniscus shape having a convex surface facing the object side and a concave surface facing the image side near the optical axis X as in the Examples 3 and 4.

Furthermore, the image-side surface of the fifth lens L5 is formed as the aspheric surface having at least one pole point in a position off the optical axis X. Therefore, the field curvature and the distortion can be properly corrected, and a light ray incident angle to an image sensor can be appropriately controlled.

The sixth lens L6 has the positive refractive power. The sixth lens L6 has an object-side surface being plane near the optical axis X, an entire surface of an image-side surface is convex and both-side surfaces are aspheric. By the aspheric surface on the object side of the sixth lens L6, the chromatic aberration of magnification and the distortion are properly corrected. In addition, when the entire surface of an image-side surface of the sixth lens L6 is convex, an emission angle of an off-axial light ray emitted from this surface is controlled to be small and off-axial aberration can be properly corrected.

The refractive power of the sixth lens L6 may be negative as in the Examples 3 and 4. Furthermore, the object-side surface of the sixth lens L6 may be a concave surface or a convex surface which the refractive power is weakened near the optical axis X as in the Examples 3 and 4.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected.

Furthermore, in comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (26).

(1) $0.60 < TTL/f < 1.00$
(2) $1.00 < r2/f < 1.90$
(3) $0.72 < D2/D3 < 1.07$
(4) $0.50 < r10/f < 1.00$
(5) $-13.00 < r12/f < -1.90$
(6) $-0.20 < (Nd6-1)/r11 \leq 0.0$
(7) $-1.30 < f2/f < -0.70$
(8) $-1.80 < f5/f < -0.80$
(9) $0.30 < T3/T4 < 0.90$
(10) $0.05 < D6/f < 0.25$
(11) $1.80 < |r9|/f < 19.00$
(12) $3.5 < |f3|/f$
(13) $-7.0 < (D5/f5) \times 100 < -2.0$
(14) $9.0 < (T4/f) \times 100 < 24.00$
(15) $0.60 < TTL/(2 \times ih) < 1.00$
(16) $0.40 < f1/f < 0.80$
(17) $2.0 < |f6|/f < 25.0$
(18) $1.20 < (T1/f) \times 100 < 2.50$
(19) $5.0 < (T3/f) \times 100 < 13.0$
(20) $TTL/EPd \leq 2.5$
(21) $1.50 < vd1/vd2 < 3.50$
(22) $1.50 < vd3/vd4 < 3.50$
(23) $1.50 < vd5/vd6 < 3.50$
(24) $1.00 < D3/D4 < 1.30$
(25) $5.0 < f4/f$
(26) $T1 < T2 < T3 < T4$ where
TTL: a total track length,
f: a focal length of the overall optical system of the imaging lens,
f1: a focal length of the first lens L1,
f2: a focal length of the second lens L2,
f3: a focal length of the third lens L3,
f4: a focal length of the fourth lens L4,
f5: a focal length of the fifth lens L5,
f6: a focal length of the sixth lens L6,
r2: a paraxial curvature radius of the image-side surface of the first lens L1,
r9: a paraxial curvature radius of an object-side surface of the fifth lens L5,
r10: a paraxial curvature radius of an image-side surface of the fifth lens L5,
r11: a paraxial curvature radius of an object-side surface of the sixth lens L6,
r12: a paraxial curvature radius of an image-side surface of the sixth lens L6,
D2: a thickness of the second lens L2 along the optical axis X,
D3: a thickness of the third lens L3 along the optical axis X,
D4: a thickness of the fourth lens L4 along the optical axis X,
D5: a thickness of the fifth lens L5 along the optical axis X,
D6: a thickness of the sixth lens L6 along the optical axis X,
T1: a distance along the optical axis X from the image-side surface of the first lens L1 to the object-side surface of the second lens L2,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4,
T4: a distance along the optical axis X from an image-side surface of the fourth lens L4 to an object-side surface of the fifth lens L5,
Nd6: a refractive index at d-ray of the sixth lens L6,
vd1: an abbe number at d-ray of the first lens L1,
vd2: an abbe number at d-ray of the second lens L2,
vd3: an abbe number at d-ray of the third lens L3,
vd4: an abbe number at d-ray of the fourth lens L4,
vd5: an abbe number at d-ray of the fifth lens L5,
vd6: an abbe number at d-ray of the sixth lens L6,
EPd: an entrance pupil diameter, and
ih: a maximum image height.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (24a).

(1a) $0.70 < TTL/f < 0.95$
(2a) $1.10 < r2/f < 1.80$
(3a) $0.80 < D2/D3 < 1.00$
(4a) $0.50 < r10/f < 0.85$
(5a) $-11.00 < r12/f < -1.80$
(6a) $-0.10 < (Nd6-1)/r1 \leq 0.0$
(7a) $-1.20 < f2/f < -0.85$
(8a) $-1.70 < f5/f < -0.90$
(9a) $0.35 < T3/T4 < 0.85$
(10a) $0.05 < D6/f < 0.20$
(11a) $2.00 < |r9|/f < 17.00$
(12a) $3.8 < |f3|/f < 30.0$
(13a) $-6.0 < (D5/f5) \times 100 < -3.0$
(14a) $11.0 < (T4/f) \times 100 < 20.00$
(15a) $0.85 < TTL/(2 \times ih) < 1.00$
(16a) $0.45 < f1/f < 0.70$
(17a) $3.0 < |f6|/f < 23.0$
(18a) $1.30 < (T1/f) \times 100 < 2.30$
(19a) $6.5 < (T3/f) \times 100 < 11.5$
(20a) $TTL/EPd \leq 2.30$
(21a) $2.30 < vd1/vd2 < 3.00$
(22a) $2.30 < vd3/vd4 < 3.00$
(23a) $2.30 < vd5/vd6 < 3.00$
(24a) $1.00 < D3/D4 < 1.20$ The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes paraxial curvature radius, k denotes a conic constant, and A4, A6, A8, A10, A12, A14 and A16 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 5.89
Fno = 2.40
ω(*) = 26.0
i h = 2.91
TTL = 5.44

Surface Data

| Surface Number i | Curvature Radius r | Surface Distance d | Refractive Index Nd | Abbe Number vd |
|---|---|---|---|---|
| (Object) | Infinity | Infinity | | |
| 1(Stop) | Infinity | −0.6408 | | |
| 2* | 1.4827 | 0.8950 | 1.544 | 55.86 (vd1) |
| 3* | 7.3407 | 0.0899 | | |
| 4* | 4.7168 | 0.2400 | 1.671 | 19.48 (vd2) |
| 5* | 2.2000 | 0.3559 | | |
| 6* | 6.5130 | 0.2700 | 1.535 | 55.66 (vd3) |
| 1* | 4.4156 | 0.4576 | | |
| 8* | 5.6189 | 0.2430 | 1.671 | 19.48 (vd4) |
| 9* | 6.9720 | 1.0239 | | |
| 10* | −16.0922 | 0.3350 | 1.544 | 55.86 (vd5) |
| 11* | 4.2225 | 0.0900 | | |
| 12* | Infinity | 0.5797 | 1.671 | 19.48 (vd6) |
| 13* | −13.8009 | 0.4000 | | |
| 14 | Infinity | 0.2100 | 1.517 | 64.20 |
| 15 | Infinity | 0.3068 | | |
| Image Plane | Infinity | | | |

Constituent Lens Data

| Lens | Start Surface | Focal Length | Entrance pupil diameter |
|---|---|---|---|
| 1 | 2 | 3.239 | EPD 2.450 |
| 2 | 4 | −6.391 | |
| 3 | 6 | −26.843 | |
| 4 | 8 | 40.261 | |
| 5 | 10 | −6.110 | |
| 6 | 12 | 20.574 | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −7.638400E−04 | −1.032419E−01 | −2.778076E−01 | −2.559684E−01 | −1.924440E−01 | −1.893077E−01 |
| A6 | 1.886196E−03 | 2.719422E−01 | 7.328264E−01 | 7.259810E−01 | 8.140480E−02 | 3.799443E−01 |
| A8 | 3.321422E−03 | −2.697881E−01 | −9.803038E−01 | −8.085801E−01 | 1.144945E+00 | −2.391491E−01 |
| A10 | −3.903985E−03 | 1.420983E−01 | 9.240218E−01 | 5.129072E−02 | −3.147720E+00 | 2.811164E−01 |
| A12 | 1.868012E−03 | −3.253013E−02 | −5.936662E−01 | 1.971112E+00 | 4.456886E+00 | −3.467526E−01 |
| A14 | 0.000000E+00 | 0.000000E+00 | 2.326502E−01 | −2.903371E+00 | −3.377840E+00 | 1.657299E−01 |
| A16 | 0.000000E+00 | 0.000000E+00 | −4.245513E−02 | 1.442550E+00 | 1.084853E+00 | 0.000000E+00 |

TABLE 1-continued

Example 1
Unit mm
f = 5.89
Fno = 2.40
ω(*) = 26.0
i h = 2.91
TTL = 5.44

|     | Eighth Surface | Ninth Surface | Tenth Surface | Eleventh Surface | Twelfth Surface | Thirteenth Surface |
| --- | --- | --- | --- | --- | --- | --- |
| k   | 0.000000E+00 | 0.000000E+00 | 0.000000E+00 | 0.000000E+00 | 0.000000E+00 | 0.000000E+00 |
| A4  | −2.172670E−01 | −1.761129E−01 | −1.376172E−01 | −1.526294E−01 | −8.479018E−02 | −6.942928E−02 |
| A6  | 1.979692E−01 | 1.603319E−01 | 2.785899E−02 | 5.920655E−02 | 6.349554E−02 | 4.183741E−02 |
| A8  | −2.759309E−01 | −2.171734E−01 | −6.140662E−03 | −2.291123E−02 | −3.511805E−02 | −1.838274E−02 |
| A10 | 4.469390E−01 | 3.086414E−01 | 8.133810E−03 | 6.405009E−03 | 1.162248E−02 | 4.970654E−03 |
| A12 | −3.896058E−01 | −2.364990E−01 | −3.216751E−03 | −1.047944E−03 | −2.185163E−03 | −8.171856E−04 |
| A14 | 1.559313E−01 | 8.619780E−02 | 5.147373E−04 | 7.644512E−05 | 2.237491E−04 | 8.009891E−05 |
| A16 | −2.355769E−02 | −1.217556E−02 | −3.043098E−05 | 0.000000E+00 | −1.001231E−05 | −3.638271E−08 |

The imaging lens in Example 1 satisfies conditional expressions (1) to (26) as shown in Table 5.

Figure 2:
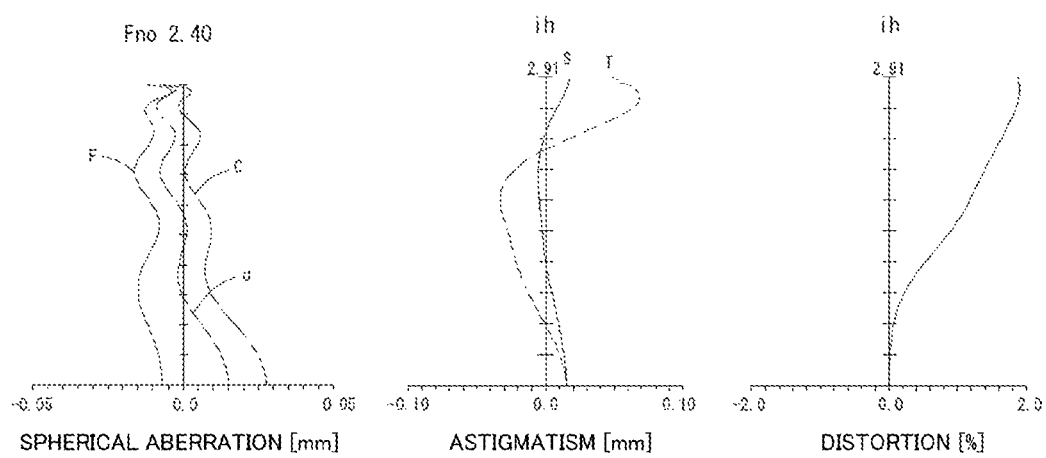
FIG. 2 shows spherical aberration, astigmatism, and distortion of the imaging lens in Example 1 according to the present invention.
Figure 3:
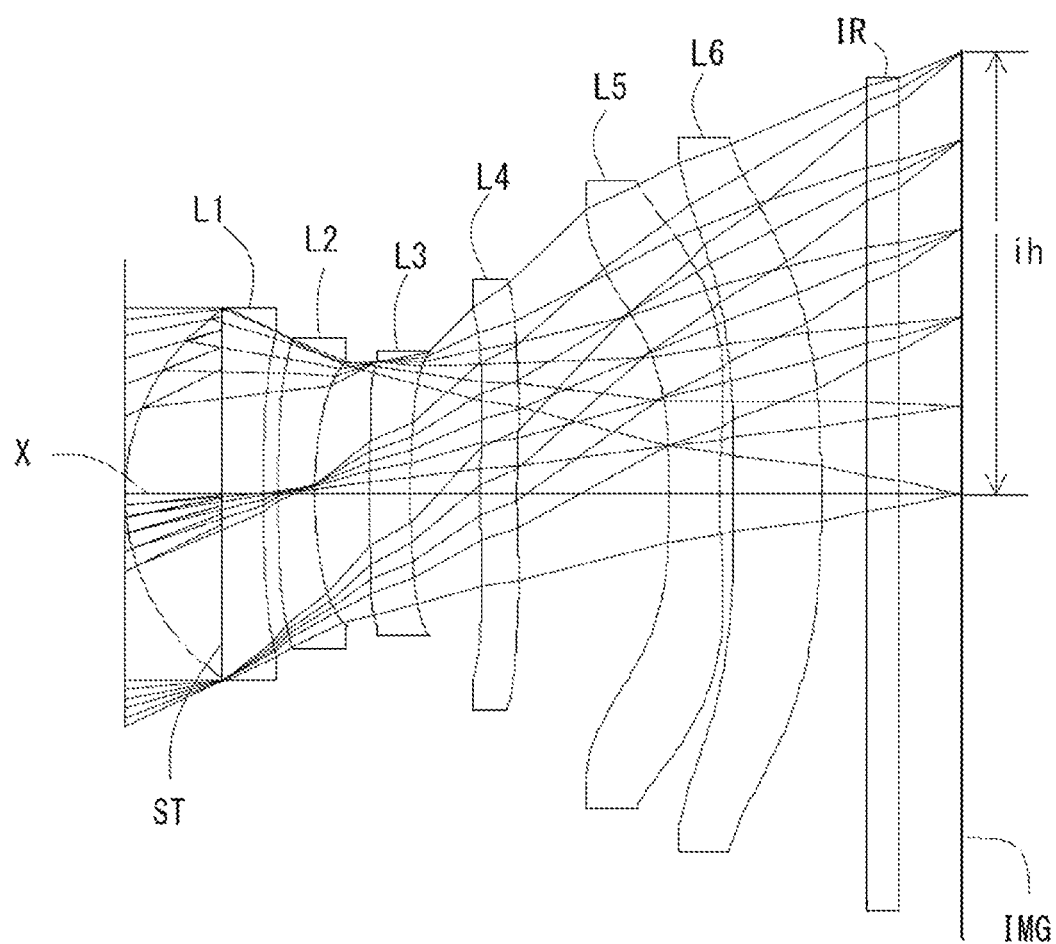
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6 and 8). As shown in FIG. 2, each aberration is corrected excellently.

Example 2

The basic lens data is shown below in Table 2.

TABLE 2

Example 2
Unit mm
f = 5.89
Fno = 2.40
ω(*) = 26.0
i h = 2.91
TTL = 5.44

Surface Data

| Surface Number i | Curvature Radius r | Surface Distance d | Refractive Index Nd | Abbe Number νd |
| --- | --- | --- | --- | --- |
| (Object) | Infinity | Infinity | | |
| 1(Stop) | Infinity | −0.6441 | | |
| 2* | 1.4826 | 0.9060 | 1.544 | 55.86 (vd1) |
| 3* | 8.2502 | 0.0975 | | |
| 4* | 5.0511 | 0.2400 | 1.671 | 19.48 (vd2) |
| 5* | 2.2029 | 0.3625 | | |
| 6* | 7.5813 | 0.2700 | 1.535 | 55.66 (vd3) |
| 7* | 4.7183 | 0.4571 | | |
| 8* | 4.6647 | 0.2439 | 1.671 | 19.48 (vd4) |
| 9* | 5.5819 | 0.9989 | | |
| 10* | −14.4325 | 0.3350 | 1.544 | 55.86 (vd5) |
| 11* | 4.4764 | 0.0900 | | |
| 12* | Infinity | 0.5792 | 1.671 | 19.48 (vd6) |
| 13* | −13.4677 | 0.3000 | | |
| 14 | Infinity | 0.2100 | 1.517 | 64.20 |
| 15 | Infinity | 0.4062 | | |
| Image Plane | Infinity | | | |

Constituent Lens Data

| Lens | Start Surface | Focal Length | Entrance pupil diameter |
| --- | --- | --- | --- |
| 1 | 2 | 3.171 | EPD 2.450 |
| 2 | 4 | −6.028 | |
| 3 | 6 | −24.157 | |
| 4 | 8 | 38.237 | |
| 5 | 10 | −6.238 | |
| 6 | 12 | 20.077 | |

TABLE 2-continued

Example 2
Unit mm
f = 5.89
Fno = 2.40
ω(*) = 26.0
i h = 2.91
TTL = 5.44

Aspheric Surface Data

|     | Second Surface | Third Surface | Fourth Surface | Fifth Surface | Sixth Surface | Seventh Surface |
|-----|---------------|---------------|----------------|---------------|---------------|-----------------|
| k   | 0.000000E+00  | 0.000000E+00  | 0.000000E+00   | 0.000000E+00  | 0.000000E+00  | 0.000000E+00    |
| A4  | 1.110720E−03  | −1.001271E−01 | −3.039921E−01  | −2.949919E−01 | −2.304971E−01 | −2.258548E−01   |
| A6  | −2.216007E−03 | 2.631724E−01  | 8.367468E−01   | 9.040029E−01  | 1.974684E−01  | 5.032405E−01    |
| A8  | 8.435120E−03  | −2.421637E−01 | −1.182760E+00  | −1.299532E+00 | 1.112546E+00  | −3.833125E−01   |
| A10 | −7.032401E−03 | 1.137997E−01  | 1.222957E+00   | 1.148360E+00  | −3.415441E+00 | 3.827207E−01    |
| A12 | 2.819075E−03  | −2.398434E−02 | −9.112932E−01  | 3.991679E−01  | 4.972776E+00  | −4.116873E−01   |
| A14 | 0.000000E+00  | 0.000000E+00  | 4.170472E−01   | −1.725056E+00 | −3.811280E+00 | 1.908181E−01    |
| A16 | 0.000000E+00  | 0.000000E+00  | −8.567484E−02  | 1.091362E+00  | 1.230987E−00  | 0.000000E+00    |

|     | Eighth Surface | Ninth Surface | Tenth Surface | Eleventh Surface | Twelfth Surface | Thirteenth Surface |
|-----|----------------|---------------|---------------|------------------|-----------------|--------------------|
| k   | 0.000000E+00   | 0.000000E+00  | 0.000000E+00  | 0.000000E+00     | 0.000000E+00    | 0.000000E+00       |
| A4  | −2.545218E−01  | −2.114849E−01 | −1.542949E−01 | −1.512320E−01    | −6.461189E−02   | −5.967387E−02      |
| A6  | 2.604819E−01   | 2.161776E−01  | 5.143679E−02  | 5.513800E−02     | 3.433126E−02    | 3.188756E−02       |
| A8  | −3.137354E−01  | −2.700568E−01 | −2.766835E−02 | −1.873784E−02    | −1.308644E−02   | −1.344467E−02      |
| A10 | 4.234400E−01   | 3.353596E−01  | 2.132583E−02  | 4.660879E−03     | 2.484394E−03    | 3.833021E−03       |
| A12 | −3.358249E−01  | −2.406263E−01 | −7.772461E−03 | −7.175402E−04    | −1.172697E−04   | −7.367140E−04      |
| A14 | 1.222738E−01   | 3.416752E−02  | 1.309079E−03  | 5.311128E−05     | −1.695148E−05   | 8.789036E−05       |
| A16 | −1.591767E−02  | −1.144347E−02 | −8.516965E−05 | 0.000000E+00     | 1.359126E−06    | −4.628244E−0B      |

The imaging lens in Example 2 satisfies conditional expressions (1) to (26) as shown in Table 5.

Figure 4:
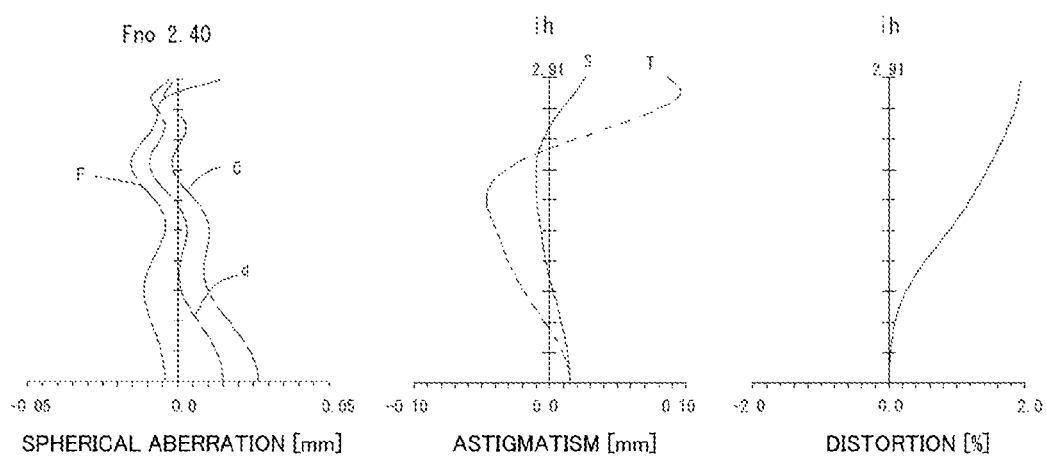
FIG. 4 shows spherical aberration, astigmatism, and distortion of the imaging lens in Example 2 according to the present invention.
Figure 5:
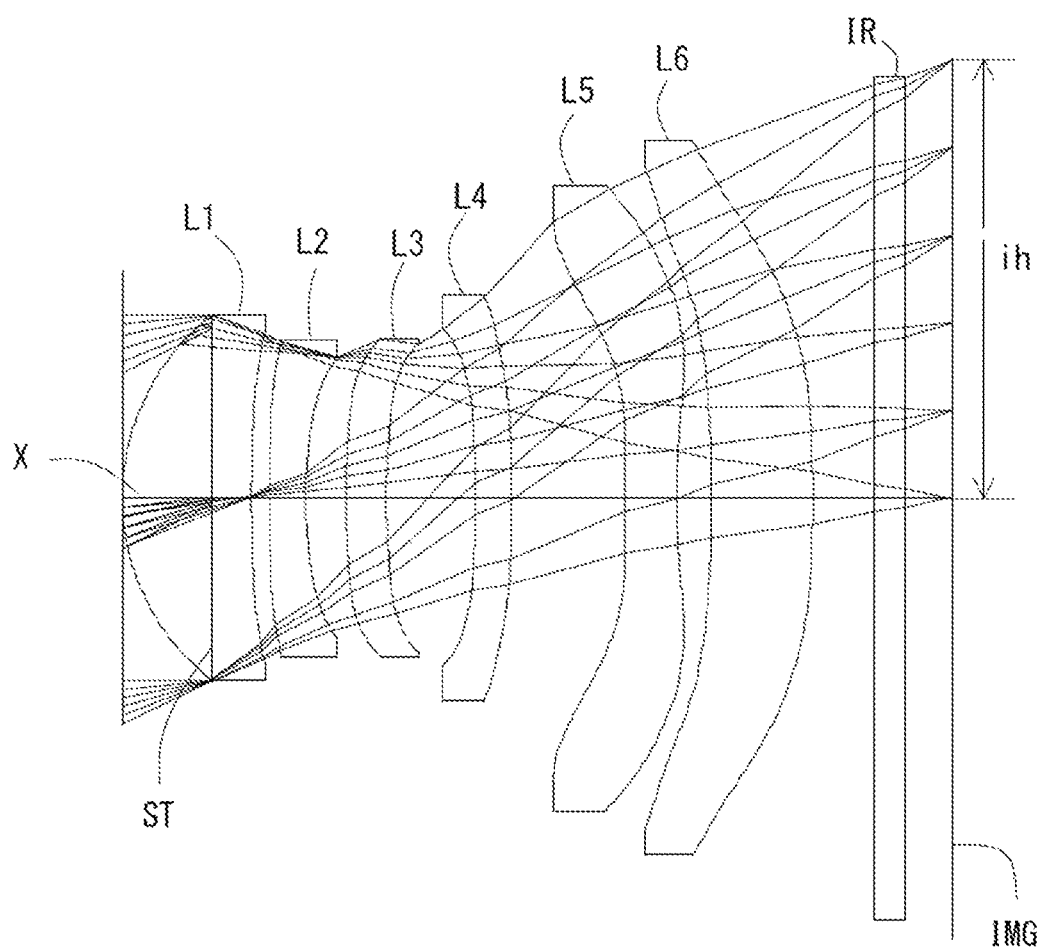
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 5. 84
Fno = 2.41
ω(*) = 26.3
i h = 2.91
TTL = 5.42

Surface Data

| Surface Number i | Curvature Radius r | Surface Distance d | Refractive Index Nd | Abbe Number vd |
|------------------|--------------------|--------------------|---------------------|----------------|
| (Object)         | Infinity           | Infinity           |                     |                |
| 1(Stop)          | Infinity           | −0.5907            |                     |                |
| 2*               | 1.5346             | 0.8559             | 1.544               | 55.86 (vd1)    |
| 3*               | 8.7385             | 0.1171             |                     |                |
| 4*               | 6.1670             | 0.2400             | 1.661               | 20.37 (vd2)    |
| 5*               | 2.4017             | 0.2659             |                     |                |
| 6*               | 3.9394             | 0.2700             | 1.535               | 55.86 (vd3)    |
| 7*               | 4.5849             | 0.5854             |                     |                |
| 8*               | Infinity           | 0.2400             | 1.661               | 20.37 (vd4)    |
| 9*               | Infinity           | 0.7564             |                     |                |
| 10*              | 87.9816            | 0.3371             | 1.544               | 55.86 (vd5)    |
| 11*              | 4.0169             | 0.2344             |                     |                |
| 12*              | −13.8533           | 0.6678             | 1.661               | 20.37 (vd6)    |
| 13*              | −22.0494           | 0.4000             |                     |                |
| 14               | Infinity           | 0.2100             | 1.517               | 64.20          |
| 15               | Infinity           | 0.3103             |                     |                |
| Image Plane      | Infinity           |                    |                     |                |

TABLE 3-continued

Example 3
Unit mm
f = 5.84
Fno = 2.41
ω(*) = 26.3
ih = 2.91
TTL = 5.42

Constituent Lens Data

| Lens | Start Surface | Focal Length | Entrance pupil diameter |
|---|---|---|---|
| 1 | 2 | 3.283 | EPD 2.420 |
| 2 | 4 | −6.108 | |
| 3 | 6 | 45.662 | |
| 4 | 8 | Infinity | |
| 5 | 10 | −7.744 | |
| 6 | 12 | −58.293 | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.360111E−03 | −1.029233E−01 | −2.987961E−01 | −3.107843E−01 | −2.008954E−01 | −1.064039E−01 |
| A6 | −2.532439E−03 | 2.875278E−01 | 8.566776E−01 | 9.017832E−01 | 2.524251E−01 | 1.039374E−01 |
| A8 | 1.222467E−02 | −2.991800E−01 | −1.175185E+00 | −1.250859E+00 | 3.445972E−01 | 4.197412E−01 |
| A10 | −1.148918E−02 | 1.685134E−01 | 1.004998E+00 | 1.206544E+00 | −8.881592E−01 | −8.355530E−01 |
| A12 | 4.537640E−03 | −4.288997E−02 | −5.171166E−01 | −4.851842E−01 | 9.593519E−01 | 7.286866E−01 |
| A14 | 0.000000E+00 | 0.000000E+00 | 1.235640E−01 | −1.754416E−01 | −5.323100E−01 | −2.322618E−01 |
| A16 | 0.000000E+00 | 0.000000E+00 | −6.744310E−03 | 1.599663E−01 | 1.170526E−01 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.848255E−01 | −1.659011E−01 | −1.108742E−01 | −8.063112E−02 | −8.533413E−02 | −1.109971E−01 |
| A6 | 1.350470E−01 | 1.716819E−01 | −8.758600E−02 | −8.392601E−03 | 1.377568E−01 | 7.592637E−02 |
| A8 | −2.452407E−01 | −2.667411E−01 | 1.169655E−01 | 1.541004E−02 | −1.202921E−01 | −3.698047E−02 |
| A10 | 4.689614E−01 | 3.866201E−01 | −5.369765E−02 | −1.127344E−02 | 5.250354E−02 | 1.074372E−02 |
| A12 | −5.140055E−01 | −3.112977E−01 | 1.318655E−02 | 4.881495E−03 | −1.207990E−02 | −1.819327E−03 |
| A14 | 2.794031E−01 | 1.232119E−01 | −1.724975E−03 | −1.020647E−03 | 1.420450E−03 | 1.721253E−04 |
| A16 | −6.597909E−02 | −1.911433E−02 | 9.439471E−05 | 7.961936E−05 | −6.779891E−05 | −7.169827E−06 |

The imaging lens in Example 3 satisfies conditional expressions (1) to (26) as shown in Table 5.

Figure 6:
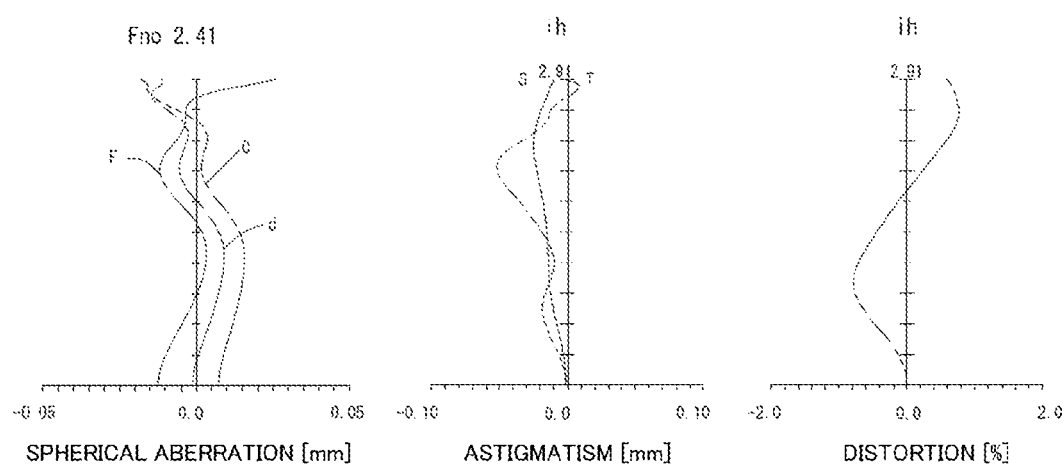
FIG. 6 shows spherical aberration, astigmatism, and distortion of the imaging lens in Example 3 according to the present invention.
Figure 7:
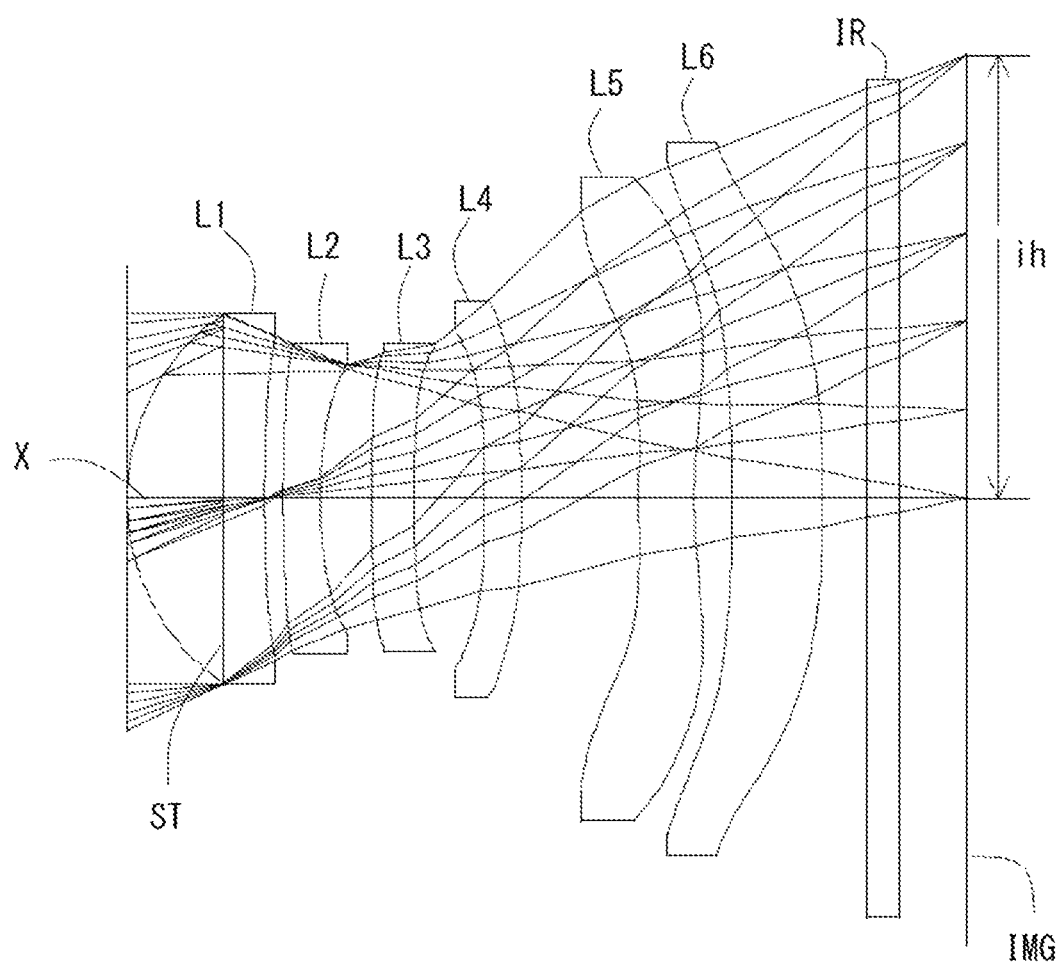
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 5.84
Fno = 2.41
ω(*) = 26.3
ih = 2.91
TTL = 5.42

Surface Data

| Surface Number i | Curvature Radius r | Surface Distance d | Refractive index Nd | Abbe Number νd |
|---|---|---|---|---|
| (Object) | Infinity | Infinity | | |
| 1(Stop) | Infinity | −0.6244 | | |
| 2* | 1.4904 | 0.8992 | 1.544 | 55.86 (νd1) |
| 3* | 9.3896 | 0.1238 | | |
| 4* | 7.0052 | 0.2401 | 1.661 | 20.37 (νd2) |
| 5* | 2.4219 | 0.3338 | | |
| 6* | 6.2240 | 0.2790 | 1.535 | 55.66 (νd3) |
| 7* | 5.6537 | 0.4639 | | |
| 8* | Infinity | 0.2407 | 1.661 | 20.37 (νd4) |
| 9* | Infinity | 0.7708 | | |

TABLE 4-continued

Example 4
Unit mm
f = 5.84
Fno = 2.41
ω(*) = 26.3
i h = 2.91
TTL = 5.42

| | | | | |
|---|---|---|---|---|
| 10* | 15.7606 | 0.3627 | 1.544 | 55.86 (vd5) |
| 11* | 3.8422 | 0.2458 | | |
| 12* | −33.4749 | 0.5882 | 1.661 | 20.37 (vd6) |
| 13* | −56.4318 | 0.3000 | | |
| 14 | Infinity | 0.2100 | 1.517 | 64.20 |
| 15 | Infinity | 0.4364 | | |
| Image Plane | Infinity | | | |

Constituent Lens Data

| Lens | Start Surface | Focal Length | Entrance pupil diameter |
|---|---|---|---|
| 1 | 2 | 3.129 | EPD 2.430 |
| 2 | 4 | −5.721 | |
| 3 | 6 | −139.085 | |
| 4 | 8 | Infinity | |
| 5 | 10 | −8.954 | |
| 6 | 12 | −125.819 | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.505984E−03 | −6.747949E−02 | −2.300133E−01 | −2.287371E−01 | −2.033308E−01 | −1.430508E−01 |
| A6 | 3.368351E−04 | 2.031977E−01 | 6.271848E−01 | 6.499919E−01 | 4.630473E−01 | 3.223782E−01 |
| A8 | 1.104571E−02 | −2.406311E−01 | −8.477833E−01 | −7.622255E−01 | −8.356016E−01 | −3.374331E−01 |
| A10 | −1.239587E−02 | 1.603840E−01 | 6.354143E−01 | 1.774331E−01 | 1.718790E+00 | 4.683363E−01 |
| A12 | 5.154436E−03 | −4.615591E−02 | −1.365681E−01 | 1.231854E+00 | −2.146778E+00 | −3.319245E−01 |
| A14 | 0.000000E+00 | 0.000000E+00 | −1.183480E−01 | −1.699964E+00 | 1.412161E+00 | 7.104780E−02 |
| A16 | 0.000000E+00 | 0.000000E+00 | 5.588802E−02 | 7.223028E−01 | −3.986553E−01 | 0.000000E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.702562E−01 | −1.669569E−01 | −1.043962E−01 | −1.013157E−01 | −1.212251E−01 | −1.253158E−01 |
| A6 | −1.686218E−01 | 1.574782E−02 | −5.502716E−02 | 5.190912E−02 | 1.930965E−01 | 1.010080E−01 |
| A8 | 7.358079E−01 | 1.595154E−01 | 6.822856E−02 | −4.330722E−02 | −1.594092E−01 | −5.545303E−02 |
| A10 | −1.210415E+00 | −2.465203E−01 | −2.111192E−01 | 1.893142E−01 | 6.759275E−02 | 1.791250E−02 |
| A12 | 1.115936E+00 | 2.192072E−01 | 1.837530E−03 | −3.705344E−03 | −1.543103E−02 | −3.363726E−03 |
| A14 | −5.242396E−01 | −1.036919E−01 | 2.254840E−04 | 2.539463E−04 | 1.818878E−03 | 3.461267E−04 |
| A16 | 8.999748E−02 | 1.881833E−02 | −3.591815E−05 | 2.281698E−06 | −8.719303E−05 | −1.511433E−05 |

The imaging lens in Example 4 satisfies conditional expressions (1) to (26) as shown in Table 5.

Figure 8:
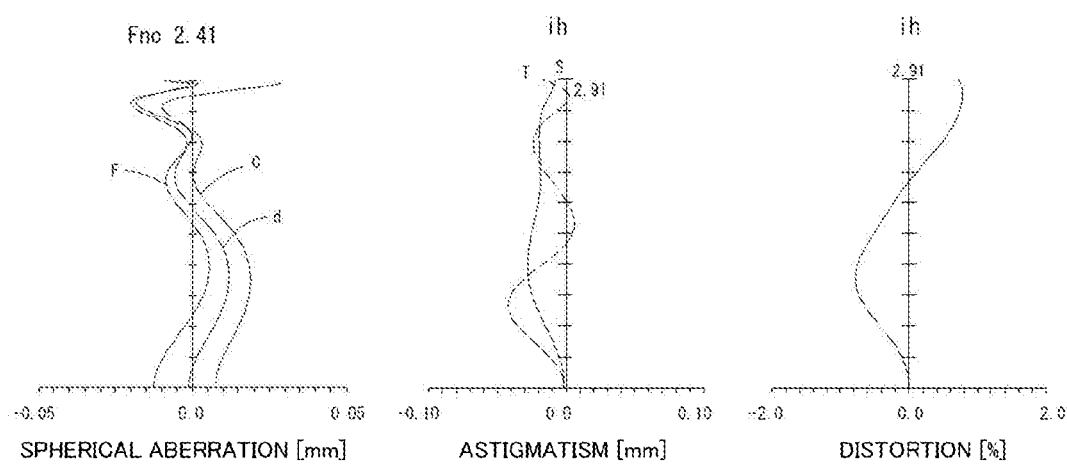
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (26) related to the Examples 1 to 4 are shown.

TABLE 5

| | Conditional expression | Example1 | Example2 | Example3 | Example4 |
|---|---|---|---|---|---|
| (1) | TTL/f | 0.92 | 0.92 | 0.93 | 0.93 |
| (2) | r2/f | 1.25 | 1.40 | 1.50 | 1.61 |
| (3) | D2/D3 | 0.89 | 0.89 | 0.89 | 0.86 |
| (4) | r10/f | 0.72 | 0.76 | 0.69 | 0.66 |
| (5) | r12/f | −2.34 | −2.29 | −3.78 | −9.65 |
| (6) | (Nd6 − 1)/r11 | 0.00 | 0.00 | −0.05 | −0.02 |
| (7) | f2/f | −1.08 | −1.02 | −1.05 | −0.98 |
| (8) | f5/f | −1.04 | −1.06 | −1.33 | −1.53 |
| (9) | T3/T4 | 0.45 | 0.46 | 0.77 | 0.60 |
| (10) | D6/f | 0.10 | 0.10 | 0.11 | 0.10 |
| (11) | |r9|/f | 2.73 | 2.45 | 15.06 | 3.21 |
| (12) | |f3|/f | 4.56 | 4.10 | 7.82 | 23.80 |
| (13) | (D5/f5) × 100 | −5.48 | −5.37 | −4.35 | −4.05 |
| (14) | (T4/f) × 100 | 17.38 | 16.96 | 12.95 | 13.19 |
| (15) | TTL/(2 × ih) | 0.93 | 0.93 | 0.93 | 0.93 |
| (16) | f1/f | 0.55 | 0.54 | 0.58 | 0.54 |
| (17) | |f6|/f | 3.49 | 3.41 | 9.98 | 21.53 |
| (18) | (T1/f) × 100 | 1.53 | 1.65 | 2.00 | 2.12 |
| (19) | (T3/f) ×100 | 7.77 | 7.76 | 10.02 | 7.84 |
| (20) | TTL/EPD | 2.22 | 2.22 | 2.24 | 2.23 |
| (21) | vd1/vd2 | 2.87 | 2.87 | 2.74 | 2.74 |
| (22) | vd3/vd4 | 2.86 | 2.86 | 2.73 | 2.73 |
| (23) | vd5/vd6 | 2.87 | 2.87 | 2.74 | 2.74 |
| (24) | D3/D4 | 1.11 | 1.11 | 1.13 | 1.16 |
| (25) | f4/f | 6.83 | 6.49 | ∞ | ∞ |
| (26) | T1 < T2 < T3 < T4 | YES | YES | YES | YES |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising in order from an object side to an image side,
a first lens with positive refractive power,
a second lens,
a third lens,
a fourth lens being a double-sided aspheric lens,
a fifth lens being a double-sided aspheric lens, and
a sixth lens having a convex surface facing the image side,
wherein said fifth lens has negative refractive power near the optical axis, and below conditional expressions (1), (2) and (3) are satisfied:

$$0.60 < TTL/f < 1.00 \qquad (1)$$

$$1.00 < r2/f < 1.90 \qquad (2)$$

$$0.72 < D2/D3 < 1.07 \qquad (3)$$

where
TTL: a total track length,
f: a focal length of the overall optical system of the imaging lens,
r2: a paraxial curvature radius of the image-side surface of the first lens,
D2: a thickness of the second lens along the optical axis, and
D3: a thickness of the third lens along the optical axis.

2. The imaging lens according to claim 1, wherein an image-side surface of said fifth lens is concave near the optical axis, and has at least one off-axial pole point.

3. The imaging lens according to claim 1, wherein a below conditional expression (4) is satisfied:

$$0.50 < r10/f < 1.00 \qquad (4)$$

where
r10: a paraxial curvature radius of an image-side surface of the fifth lens, and
f: a focal length of the overall optical system of the imaging lens.

4. The imaging lens according to claim 1, wherein a below conditional expression (5) is satisfied:

$$-13.00 < r12/f < -1.90 \qquad (5)$$

where
r12: a paraxial curvature radius of an image-side surface of the sixth lens, and
f: a focal length of the overall optical system of the imaging lens.

5. The imaging lens according to claim 1, wherein a below conditional expression (6) is satisfied:

$$-0.20 < (Nd6-1)/r11 \leq 0.0 \qquad (6)$$

where
Nd6: a refractive index at d-ray of the sixth lens, and
r11: a paraxial curvature radius of an object-side surface of the sixth lens.

6. The imaging lens according to claim 1, wherein said second lens is formed in a meniscus shape having a concave surface facing the image side near the optical axis.

7. The imaging lens according to claim 1, wherein said second lens has negative refractive power and a below conditional expression (7) is satisfied:

$$-1.30 < f2/f < -0.70 \qquad (7)$$

where
f2: a focal length of the second lens.

8. The imaging lens according to claim 1, wherein said fifth lens satisfies a below conditional expression (8):

$$-1.80 < f5/f < -0.80 \qquad (8)$$

where
f5: a focal length of the fifth lens.

9. The imaging lens according to claim 1, wherein a below conditional expression (9) is satisfied:

$$0.30 < T3/T4 < 0.90 \qquad (9)$$

where
T3: a distance along the optical axis from an image-side surface of the third lens to an object-side surface of the fourth lens, and
T4: a distance along the optical axis from an image-side surface of the fourth lens to an object-side surface of the fifth lens.

10. The imaging lens according to claim 1, wherein a below conditional expression (10) is satisfied:

$$0.05 < D6/f < 0.25 \qquad (10)$$

where
D6: a thickness of the sixth lens along the optical axis.

11. The imaging lens according to claim 1, wherein a below conditional expression (11) is satisfied:

$$1.80 < |r9|/f < 19.00 \qquad (11)$$

where
r9: a paraxial curvature radius of an object-side surface of the fifth lens.

12. The imaging lens according to claim 1, wherein a below conditional expression (12) is satisfied:

$$3.5 < |f3|/f \qquad (12)$$

where
f3: a focal length of the third lens.

13. The imaging lens according to claim 1, wherein a below conditional expression (13) is satisfied:

$$-7.0 < (D5/f5) \times 100 < -2.0 \qquad (13)$$

where
D5: a thickness of the fifth lens along the optical axis, and
f5: a focal length of the fifth lens.

14. The imaging lens according to claim 1, wherein a below conditional expression (14) is satisfied:

$$9.0 < (T4/f) \times 100 < 24.00 \qquad (14)$$

where

T4: a distance along the optical axis from an image-side surface of the fourth lens to an object-side surface of the fifth lens.

15. The imaging lens according to claim 1, wherein a below conditional expression (15) is satisfied:

$$0.60 < TTL/(2 \times ih) < 1.00 \quad (15)$$

where ih: a maximum image height.

* * * * *